(12) United States Patent
Mazur (10) Patent No.: US 11,789,136 B2
(45) Date of Patent: Oct. 17, 2023

(54) RADAR PRESENCE SENSOR DEVICE (71) Applicant: UTC Fire & Security EMEA BVBA, Diegem (BE)

(72) Inventor: Mateusz Mazur, Sopot (PL)

(73) Assignee: UTC FIRE & SECURITY EMEA BVBA, Diegem (BE)

( * ) Notice: Subject to any disclaimer, the term of this patent is extended or adjusted under 35 U.S.C. 154(b) by 247 days.

(21) Appl. No.: 17/127,338

(22) Filed: Dec. 18, 2020

(65) Prior Publication Data
US 2021/0190929 A1 Jun. 24, 2021

(30) Foreign Application Priority Data
Dec. 19, 2019 (EP) ..................................... 19218281

(51) Int. Cl.
G01S 13/04 (2006.01)
G01S 7/03 (2006.01)
G01S 13/56 (2006.01)
G01S 13/87 (2006.01)
G01S 13/88 (2006.01)
F24F 120/10 (2018.01)
F24F 11/00 (2018.01)

(52) U.S. Cl.
CPC ............... *G01S 13/04* (2013.01); *G01S 7/03* (2013.01); *G01S 13/56* (2013.01); *G01S 13/87* (2013.01); *G01S 13/886* (2013.01); *F24F 11/00* (2013.01); *F24F 2120/10* (2018.01)

(58) Field of Classification Search
CPC .......... G01S 13/04; G01S 13/56; G01S 13/87; G01S 13/88

USPC ....................................... 342/27, 28, 59, 114
See application file for complete search history.

(56) References Cited

U.S. PATENT DOCUMENTS

| 3,827,049 A | * | 7/1974 | van Staaden | G01S 13/66 342/80 |
| 4,400,700 A | * | 8/1983 | Rittenbach | G01S 7/415 342/111 |
| 4,517,566 A | * | 5/1985 | Bryant | G01S 13/60 342/117 |

(Continued)

FOREIGN PATENT DOCUMENTS

| EP | 0184424 A2 | 6/1986 |
| EP | 1869492 A1 | 12/2007 |

(Continued)

OTHER PUBLICATIONS

Radar Basics, Tektronix, www.tek.com (Year: 2017).*

(Continued)

*Primary Examiner* — Vladimir Magloire
*Assistant Examiner* — Michael W Justice
(74) *Attorney, Agent, or Firm* — CANTOR COLBURN LLP (57) ABSTRACT

A presence sensor device 8 for a building. The presence sensor device 8 is for detecting persons and includes a first radar sensor 14 and a second radar sensor 20. The first radar sensor 14 is arranged to operate with a first frequency band, a first power consumption, and a first range, with the second radar sensor 20 being arranged to operate with a second frequency band, a second power consumption, and a second range. The first frequency band is lower than the second frequency band and the first range is longer than the second range.

12 Claims, 3 Drawing Sheets

(56) References Cited

U.S. PATENT DOCUMENTS

| | | | |
|---|---|---|---|
| 4,743,907 A * | 5/1988 | Gellekink | G01S 13/87 342/80 |
| 4,825,214 A * | 4/1989 | Dejaegher | G01S 7/35 342/128 |
| 6,307,475 B1 | 10/2001 | Kelley | |
| 7,492,303 B1 * | 2/2009 | Levitan | G01S 7/024 342/188 |
| 7,504,988 B2 * | 3/2009 | Tsuchihashi | G01S 13/87 342/158 |
| 8,305,259 B2 | 11/2012 | Margomenos | |
| 10,366,603 B2 * | 7/2019 | Ohta | G06V 20/58 |
| 10,573,959 B2 * | 2/2020 | Alland | H01Q 3/28 |
| 11,458,981 B2 * | 10/2022 | Wieczorek | B60N 3/18 |
| 11,486,962 B2 * | 11/2022 | Leabman | G01S 13/89 |
| 2008/0136702 A1 * | 6/2008 | Tsuchihashi | G01S 13/34 342/27 |
| 2008/0143529 A1 * | 6/2008 | Gauvreau | G08B 13/186 340/567 |
| 2009/0058710 A1 * | 3/2009 | Levitan | G01S 13/10 342/22 |
| 2010/0117917 A1 | 5/2010 | Kindt et al. | |
| 2011/0156946 A1 | 6/2011 | Margomenos | |
| 2017/0309997 A1 * | 10/2017 | Alland | H01Q 21/29 |
| 2020/0037890 A1 * | 2/2020 | Cho | A61B 5/02444 |
| 2020/0191945 A1 * | 6/2020 | Leabman | G01S 13/04 |
| 2020/0331486 A1 * | 10/2020 | Wieczorek | B60W 50/045 |

FOREIGN PATENT DOCUMENTS

| | | | |
|---|---|---|---|
| EP | 3713149 | | 9/2020 |
| JP | 09507648 | * | 1/1997 ............ G01S 13/87 |
| JP | 2006105897 A | | 4/2006 |
| WO | 2006107565 A1 | | 10/2006 |

OTHER PUBLICATIONS

European Search Report for Application No. 19218281.4; dated Jun. 29, 2020; 12 Pages.

European Search Report for Application No. 19218281.4; dated Sep. 23, 2020; 12 Pages.

* cited by examiner

RADAR PRESENCE SENSOR DEVICE

FOREIGN PRIORITY

This application claims priority to European Patent Application No. 19218281.4, filed Dec. 19, 2019, and all the benefits accruing therefrom under 35 U.S.C. § 119, the contents of which in its entirety are herein incorporated by reference.

TECHNICAL FIELD

The present invention relates to a presence sensor device for a building, the presence sensor device being for detecting people. The example embodiments include security systems. Related methods for detecting people are also disclosed.

BACKGROUND

It is known to use various different sensor types to detect presences by reference to detecting objects and/or movement. For example, sensors are in context of a security system for a building, where it is desired to detect potential intruders. In addition, presence sensor devices for buildings have also been proposed for monitoring the occupancy state of a monitored zone and/or for counting a number of people that are present in a monitored zone. As well as security applications this type of sensing is useful for identifying the presence of people during evacuations or in relation to control of building systems such as heating, ventilation and air conditioning (HVAC) systems.

In the prior art, infrared (IR) sensors are very commonly used. They can detect an object or person having a temperature that is significantly different to the background temperature. Video detection may also be used. Other known sensors may use radar waves or laser-based systems for intruder detection. In relation to sensors for buildings it is known to place sensors for detecting presences within the building or in areas around the building. In this context it will be appreciate that the building may be any kind of a structure or installation where it might be required to detect people.

Radar sensors may have some advantages over IR sensors such as increased resolution of detected images and an ability to detect both the presence and also the position of an intruder relative to the sensor within the detection zone of the sensor. It will be appreciated that this then allows improvements in relation to detection of multiple people and discrimination between people or other presences (e.g. animals) in circumstances where there are two separate presences within a monitored zone. This is not always possible with IR sensor systems. Another advantage of a radar sensor is that radio waves are able to penetrate through a wide range of materials, including some materials used for internal and external walls of buildings. This means that furniture in a room or even walls may not prevent a radar sensor from detecting intruders in a monitored zone that is on the other side of a wall or is in some other way obstructed in terms of visible line-of-sight. Nonetheless, known radar sensors still have some limitations and improved radar based sensor devices are desirable.

SUMMARY

Viewed from a first aspect the invention provides a presence sensor device for a building, the presence sensor device being for detecting persons, wherein the presence sensor device comprises: a first radar sensor; and a second radar sensor; wherein the first radar sensor is arranged to operate with a first frequency band, a first power consumption, and a first range, with the second radar sensor being arranged to operate with a second frequency band, a second power consumption, and a second range; and wherein the first frequency band is lower than the second frequency band, with the first range being longer than the second range.

With this sensor device two different radar sensors (radars) are used for more effectively detecting presences such as people that are in or around a building. The presence sensor device may be used within a building or at other locations, including exterior locations around a building or elsewhere. The properties of radar sensors vary depending on factors such as power usage, frequency, and so on. By combining two radar sensors with different capabilities in relation to range, frequency band, and power usage then it becomes possible to obtain advantages in relation to the combined range and resolution of the sensor device as a whole, since the advantages of the two radars are combined and their disadvantages can in some cases be reduced or ignored. Also, the information given from a single radar sensor may not be sufficient to identify a presence, or may generate a false positive, whereas the use of two sensors with different capabilities allows for higher reliability and accuracy.

Advantageously, the second radar sensor may be arranged to operate with a higher resolution than the first radar sensor. The presence sensor device may hence be capable of long range sensing at relatively low resolution via the first radar sensor, such as to detect presences at the outer parts of a monitored zone further from the sensing device, whilst also being capable of short range sensing at a relatively high resolution, such as to detect and more accurately resolve presences closer to the sensing device.

The second power consumption may be higher than the first power consumption, i.e. such that the first radar sensor consumes less power than the power consumed by the second radar sensor. The presence sensor device may be arranged to selectively operate the second, higher power consumption, radar sensor in reaction to the output of the first, lower power consumption, radar sensor so that sensing of a presence by the first radar sensor triggers activation of the second radar sensor. This allows for low power consumption until a presence is detected, at which time the sensing capabilities of the second radar sensor can be combined with the first, for example in order to have higher resolution detection. The presence sensor device may be arranged to operate in a first mode where the first radar sensor is active and the second radar sensor is inactive and wherein sensing of a presence by the first radar sensor triggers a second mode, with activation of the second radar sensor. Optionally, in the second mode both of the first and second radar sensors are used, and thus the first radar sensor may remain active after the second radar sensor is activated. The presence sensor device may be arranged to revert to the first mode if a predetermined time elapses with no presence being detected by either the first or second radar sensor.

The first radar sensor has an operating frequency band that is lower than the operating frequency band of the second radar sensor. The operating frequency band for the first radar sensor may be a frequency band that is in the range 800 MHz to 25 GHz, with the operating frequency band of the second radar sensor being higher than that of the first, and in the range 5-130 GHz. The radar sensors may use radio signals at a frequency bands of 900 MHz, 2.4 GHz, 5.8 GHz, 10 GHz, 24 GHz, 60 GHz, 77 GHz bands, or any other frequency bands according to standards-based frequency ranges dedicated for radar sensors operating for presence detection. In broad terms, the first radar sensor may operate at RF and/or microwave frequencies, whereas the second radar sensor may operate at higher microwave frequencies or millimetre wave frequencies. The radar sensors may use frequency bands where there is no restriction to radar operation methods and technology, and thus the first radar sensor and/or the second radar sensor may be Frequency Modulated Continuous Wave (FMCW) radar, Continuous Wave (CW) radar, pulses radar, or Ultra Wide-Band technology (UWB) radar or any other.

Typically the properties of radar sensors change in accordance with the frequency band of their operation. Different limitations are met at lower frequencies compared to when radar is operating at higher frequencies. When the frequency is relatively low, the range is usually increased but the size of a single radiating source is large. In view of this it is not possible to build an antenna array in a limited sensor surface that will allow the sensor to obtain reasonable beam scanning and good angular resolution with the lower frequency band. In contrast, for a radar sensor operating at relatively high frequencies, the implementation of an extensive antenna array is possible in a smaller size enabling good angular resolution. However, higher frequencies such as those in the millimetre band have lesser capabilities for penetration through loss obstacles and also generally have limited range due to regulatory restrictions on exposure to radiation at those frequencies. Thus, by combining two radar sensors with different operating frequencies it becomes possible for the presence sensor device to have better capabilities than devices with a single radar sensor, extending the combined frequency bands of operation, whilst also working within constraints on the size of the device.

In addition to the above advantages, radar sensors are sensitive to distortions linked to their operating frequencies. The installation location for the presence sensor device can often have interference from other emission sources, such as electrical devices producing electromagnetic radiation (e.g. transformers, microwave ovens) and radio transmitter devices. Interference may also be intentionally generated for radar sensor jamming, for example by an intruder seeking to avoid a security system. The use of two different frequencies minimises the adverse effect of interference of those types, since interference that may impact the first radar sensor may not reduce the effectiveness of the second radar sensor, and vice versa.

The first radar sensor and second radar sensor may comprise respective first and second antenna systems. The first and second antenna systems may be part of a single device, such as being within a single housing. Typical presence sensors for buildings are required to be relatively small, and thus the presence sensor device may be arranged to fit within a housing with maximum dimensions 125 mm, i.e. a housing that fits within a 125 mm cube, or a housing that fits within a cuboid with dimensions 125×125×50 mm. As noted above, the use of two different radar sensors can allow size constraints to be met whilst keeping adequate capabilities such as with reference to the overall range and resolution capabilities of the presence sensor device.

The first radar sensor may comprise a first antenna system in the form of a single antenna element or a first array of multiple antenna elements, where the antenna element(s) for the first radar sensor are of relatively large dimensions. The second radar sensor may comprise a second antenna system in the form of a second array of antenna elements of relatively small dimensions. The antenna systems may each comprise at least one antenna element, and optionally can include more than one antenna element, such as at least two antenna elements. The second antenna system's antenna elements may be located nearby the first antenna element(s), for example between first and second antenna elements of the first array of antenna elements. The second antenna system may include a larger number of antenna elements than the number of elements in the first antenna system. This can aid in achieving higher resolution for the second radar sensor.

The antenna systems may include common antenna elements for transmitter and receiver.

For example, the presence sensor may include antenna element(s) common for both transmitter and receiver or, for another example, the first antenna system for the first radar sensor may comprise at least one transmitting antenna element and at least one receiving antenna element. The second antenna system may be located between those two antenna elements, and may itself comprise multiple transmitting antenna elements and multiple receiving antenna elements.

The presence sensor device is for detecting presences such as people in a monitored zone, i.e. an area within which the radar sensors can effectively determine a presence. By the use of two sensors, with differing range capabilities, the size of the monitored zone can be maximised without compromise in terms of accuracy and positioning of the presence in shorter ranges. The monitored zone for the presence sensor device may comprise a long range detection zone where the first radar sensor with its longer range is used, and where presences may only need to be detected without the need for any additional detection information, such as positioning. Thus, the extent of the monitored zone may be maximised by removing the need for angular positioning of a presence at longer range. The monitored zone may also include a short range detection zone, covering a lesser area than the long range detection zone, where the second radar sensor is used in order to determine both distance and position when a presence is detected, e.g. angle and radius.

Optionally, the first radar sensor and the second radar sensor are used together to sense presences in the short range detection zone. This can result in improvements with respect to the signal to noise ratio for the combined signal, as well as increased certainty about the output from the sensor device. As a consequence, the effective resolution of the device can further increase at short range compared to the resolution of the second radar sensor when used alone.

Each radar sensor comprises a transmitter and a receiver, which may comprise a combined transmitting and receiving antenna array, such as that discussed above. The transmitter may be configured to transmit radio signals into a space that includes the detection zone for the radar sensor, where the detection zone forms at least a part of the monitored zone of the presence sensor device. The transmitter may also be configured to transmit signals to a control device, the control device configured to control the radar sensor. The control device may be used to receive appropriate information about the detected target and its parameters, which may be shared to other systems and/or trigger alarms. The transmitter may also be configured to transmit signals to other radar sensors. The transmitter may use any kind of antenna, such as a single source or an array of antenna elements as discussed above, where the antenna is paired with a generator producing appropriate signals.

As is known in this field, radio signals may be reflected by objects in the monitored zone, i.e. within a detection zone for the first radar sensor or second radar sensor. The reflected radio wave may be detected by the receiver. The receiver may share an antenna with the transmitter or may use a separate antenna. The receiver receives signals from a space that includes the detection zone for the radar sensor. The receiver may comprise multiple antennas oriented in different directions to collect the reflected signals. The receiver may also be configured to collect signals from a control device or from other radar sensors.

Each radar sensor may comprise a processor for processing of the radar data to provide processed radar signals, for example radar signals that indicate a range of a detected object and/or that indicate a position of the object, such as via reference to an angle relative to a reference direction. In that case the presence sensor device may comprise a data integration module for combining the data from the first radar sensor and the second radar sensor to thereby provide a combined output signal that may include contributions from both radar sensors, such as in the case of a presence that is detected by both sensors. Alternatively, the receivers of both of the two radar sensors may be arranged to send output signals from the receivers to a processor of the presence sensor device, where this processor hence receives and processes raw output signals from both of the radar sensors. In the latter case the two radar sensors may be integrated into a combined integrated circuit, e.g. sharing parts of a single chip, where a single dedicated processor is provided for both radar sensors. The processor acts to process the signals from the receivers into processed radar signals and also to integrate the output from the two radar sensors to provide a combined output signal. Before the signals are passed to the processor, they may be converted to digital form in A/D converters.

The presence sensor device may comprise a control module for receiving the combined output signal. The control module may be integrated with a processor that provides the data integration module, for example they may be different software/firmware modules operating on the same hardware. In addition, the presence sensor device may comprise a memory. The control module may have functions such as one or more of post-processing of the radar signals (the combined output signal); decision making (for example with reference to triggering an alert), visualisation and/or communication. For example, the control module may be arranged for communication with a central control panel of a broader system, such as within as security system of a building as discussed below. There may be a synchronisation module for synchronising the operation of the first and second radar sensors, and once again this may be a software/firmware module operating on the same hardware as other modules, or it may be a separate element.

The presence sensor device may be configured to be supplied with power from an external power supply, such as a mains power supply of a building, and/or it may comprise an internal battery.

There may be further radar sensors with further differing capabilities, i.e. differing range, resolution, power, and/or frequency band, as discussed above. Thus, the presence sensor device may comprise three or more radar sensors, each giving different advantages and different limitations.

The presence sensor device may be for a building control system, and thus provided within a building control system, such as a security system and/or a HVAC control system for a building. Thus, the invention extends to a building control system comprising a presence sensor device as discussed above. The building control system may be arranged to use the presence sensor device for detecting people in or near the building. For example, the building control system may be arranged to use the presence sensor device for detecting intruders, for monitoring the location or movement of people during evacuations and/or for identifying the presence of people in relation to control of HVAC systems or health care. In this context the monitored zone for the presence sensor device may be an area within the building, such as a room, and/or an area outside of the building, typically adjacent the building. The monitored zone may comprise areas to either side of a dividing structure, such as a window, door or wall. It is an advantage of radar sensors that they may "see through" such structures. In some examples the first, longer range, radar sensor may have a detection zone extending beyond a dividing structure (i.e. to the opposite side of the structure than the location of the presence sensor device), whereas the second, shorter range, radar sensor may have a detection zone that does not extend beyond the dividing structure. The invention further extends to a building including the building control system.

The invention may extend to a method of use of the presence sensor device for the detection of presences such as people or a vehicle outside. This method may include using a device with any of the above discussed features. The method may include using the sensor within a building control system of a building, such as for detecting intruders, for monitoring the location or movement of people during evacuations and/or for identifying the presence of people in relation to control of HVAC systems.

The method may comprise selectively operating the second, higher power, radar sensor in reaction to the output of the first, lower power, radar sensor, wherein in a first mode the first radar sensor is active and the second radar sensor is inactive and wherein sensing of a presence by the first radar sensor triggers a second mode, with activation of the second radar sensor, where in the second mode both of the first and second radar sensors are used. The method may include reverting to the first mode if a predetermined time elapses with no presence being detected by either the first or second radar sensor.

BRIEF DESCRIPTION OF THE DRAWINGS

Certain embodiments of the disclosure will now be described by way of example only and with reference to the accompanying drawings in which.

DETAILED DESCRIPTION

Figure 1A:
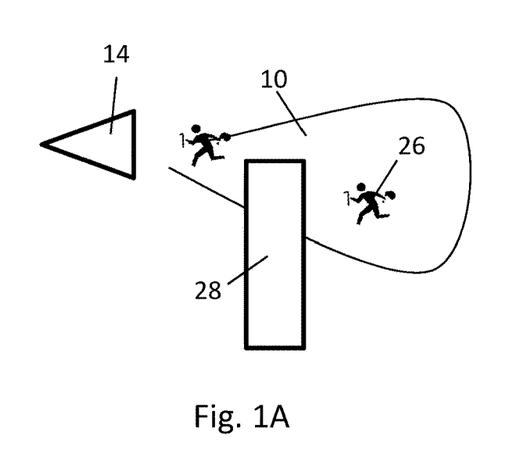
FIGS. 1A, 1B and 1C are diagrams comparing radar sensors of different capabilities, with FIG. 1B showing a presence sensor device combining two radars.
Figure 1B:
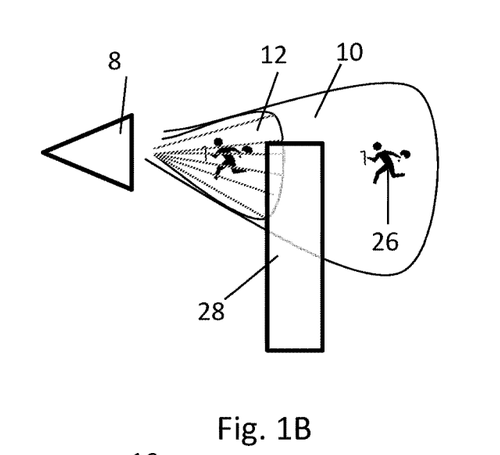
Figure 1C:
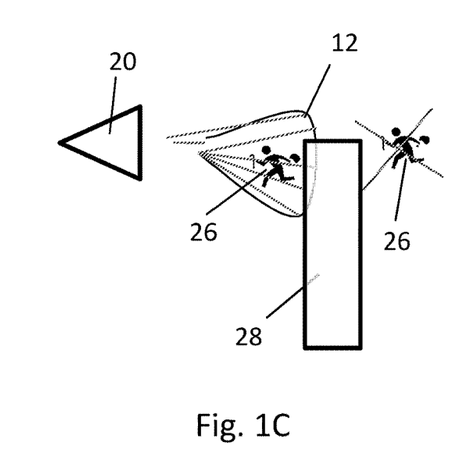
Figure 2A:
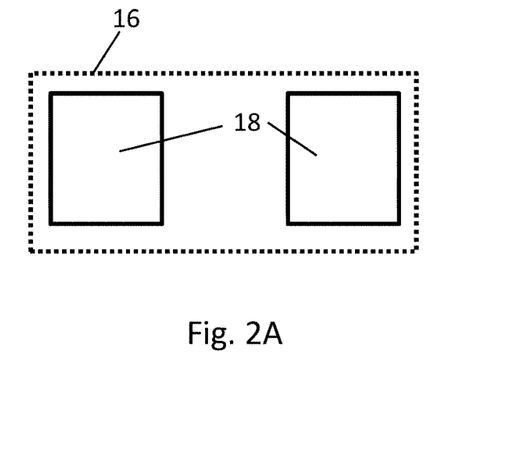
FIGS. 2A, 2B and 2C are layout diagrams of example antenna systems for the radar sensors of FIGS. 1A, 1B and 1C respectively.
Figure 2B:
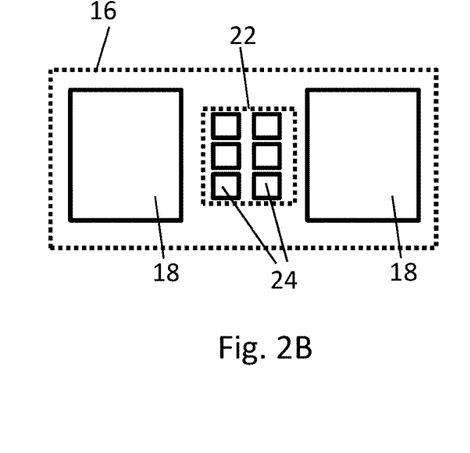

A presence sensor device is described herein, by way of example, with reference to detection of people in or around a building as shown in FIGS. 1A, 1B and 1C. One possible arrangement for antenna elements of the sensing devices of FIGS. 1A, 1B and 1C are shown, respectively in FIGS. 2A, 2B and 2C. FIG. 1B shows a presence sensing device 8 that combines the use of two radar sensors with two different detection zones 10, 12, with FIG. 2B showing a possible antenna arrangement as discussed further below. As shown in FIGS. 1A and 2A, a first radar sensor 14 has a relatively long range within the first detection zone 10 and uses a relatively large antenna system 16, which may have two antennas 18 with one being used for transmitting and one being used for receiving. Each antenna 18 can consist of a single antenna element or an array of antenna elements.

Figure 2C:
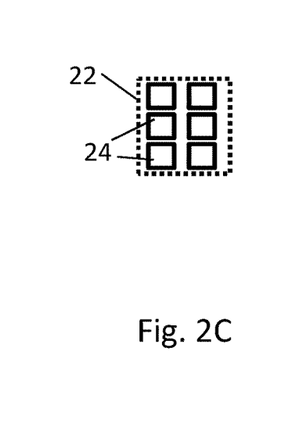

Such a radar sensor 14 can consume a relatively low power, but also has relatively inferior resolution parameters. FIGS. 1C and 2C shows a second radar sensor 20 and a possible antenna system arrangement, with a second, smaller, detection zone 12 and a smaller range than the first radar sensor 14. The second radar sensor 20 uses a relatively small second antenna system 22, with transmitting and receiving antennas 24. Each antenna 24 can consist of a single antenna element or an antenna array with multiple antenna elements.

The first radar sensor 14 typically uses a lower frequency band with narrow frequency bandwidth, which enables a longer range. Limited functionalities like reduced angular resolution can also give lower power consumption. In contrast, the second radar sensor 20 typically uses a relatively higher frequency band and wider bandwidth, which allows for a better resolution but at a shorter range and with higher power consumption. As shown in FIG. 1A the first radar sensor 14 has a relatively large detection zone 10 that can include areas beyond a dividing structure 28 (such as a wall or window, for example). The first radar sensor 14 can detect a presence within its detection zone 10, such as an intruder 26 who may be behind the structure 28, or inside of the structure 28. However, the limited angular resolution means that it is not possible to accurately determine the location of the intruder 26. With reference to FIG. 1C, the second radar sensor 20 has a smaller detection zone 12 with better capabilities at shorter range with that detection zone 12, including better angular resolution (angular and radial) than the first radar sensor 14. This allows such the second, shorter range, radar sensor 20 to accurately determine a position of the intruder 26 at short range. It is however not possible for the second radar sensor 20 to detect the intruder 26 at longer ranges, and this radar has reduced capabilities in terms of detection of presences beyond obstacles such as the dividing structure 28.

By combining the two radar sensors 14, 20 into a presence sensor device 8 as in FIG. 1B, which may hence use a combined antenna system 16, 22 as in FIG. 2B, it is possible to obtain the advantages of both, whilst limiting or avoiding the impact of their disadvantages. Further, there are combined advantages beyond the sum of the parts by the ability to have combined processing of the radar data from two sources of information, giving greater certainty about the presence and location of an object, such as the intruder 26, in particular when they are within the smaller detection zone 12 where both radar sensors 14, 20 provide useful measurements. It will be appreciated that in some situations added advantages may arise with the use of yet further radar sensors with further differing capabilities, i.e. differing range, resolution, power consumption, noise level, and/or frequency band, as discussed herein. Thus, the presence sensor device 8 in alternative implementations may comprise three or more radar sensors, each giving different advantages and different limitations in the same way as the example discussed with reference to the Figures, which uses two radar sensors 14, 20.

It will be seen that the second antenna system 22, consisting of two arrays of antennas 24, uses a greater number of smaller antenna elements than the first antenna system 16. The antenna configuration is shown in a layout diagram by way of example only, and the configuration may change to fit particular requirements. The radar sensors 14, 20 may comprise separate transmitting and receiving channels with the antennas 18, 24 hence comprising separate transmitting and receiving antenna elements. The number and/or geometry of the antennas 18, 24 in the two antenna systems 16, 22 may vary depending on the requirements of the sensor device 8, but the diagram is representative of an example placement of the antenna elements where the second antenna system 22, with its smaller size, may be placed within the antenna elements 18 of the first antenna systems 16, such as in between a pair of those elements 18. The pair of antennas 18 in the first antenna system 16 may for example comprise a transmitting element and a receiving element. This allows the presence sensor device 8, with its combined use of two radar sensors 14, 20 to occupy a similar space to the lower frequency first radar sensor 14, such that the presence sensor device 8 of FIG. 1B can be packaged in a relatively small housing, not needing to take up more room than the single radar sensor of FIG. 1A.

The operating frequency for the first radar sensor 14 can be a frequency in the range 800 MHz to 25 GHz, with the operating frequency of the second radar sensor 20 being higher than that of the first, and in the range 5-130 GHz. Thus, the first radar sensor may operate at microwave frequencies, whereas the second radar sensor may operate at high microwave and millimetre wave frequencies.

The presence sensor device 8 can be used for the detection of presences such as people with a building, and hence may be used within a building control system of a building. The building control system may comprise a plurality of presence sensor devices along with other sensors, such as further sensors for movement, supervision of doors or windows, temperature, fire and so on. Within the building control system the presence sensor device 8 may have the purpose of detecting intruders, monitoring the location or movement of people during evacuations, identifying the presence of people in relation to control of HVAC systems, and/or other purposes it is important to determine the location or number of presences such as people (or alternatively animals or other moving objects).

To minimize power consumption of the two radar sensors 14, 20 the presence sensor device is configured to selectively operating the second, higher power consumption, radar sensor 20 in reaction to the output of the first, lower power consumption, radar sensor 14. Thus, there can be a first lower power consumption mode for "normal" operation, where the first radar sensor 14 is active and the second radar sensor 20 is inactive in order to minimise power consumption. Sensing of a presence by the first radar sensor 14 triggers a second mode for an "alert" state, with activation of the second radar sensor 20. Thus, in the second "alert" mode both of the first radar sensor 14 and the second radar sensor 20 are used, which increases power consumption but allows the presence to be verified with greater certainty, and allows its position to be determined with greater accuracy, especially within the second detection zone 12. The presence sensor device 8 is configured to return to the first, low power, mode once predetermined time has elapsed with no presence being detected by either the first or second radar sensor 14, 20, such as a minute having elapsed with no presence detected.

Figure 3:
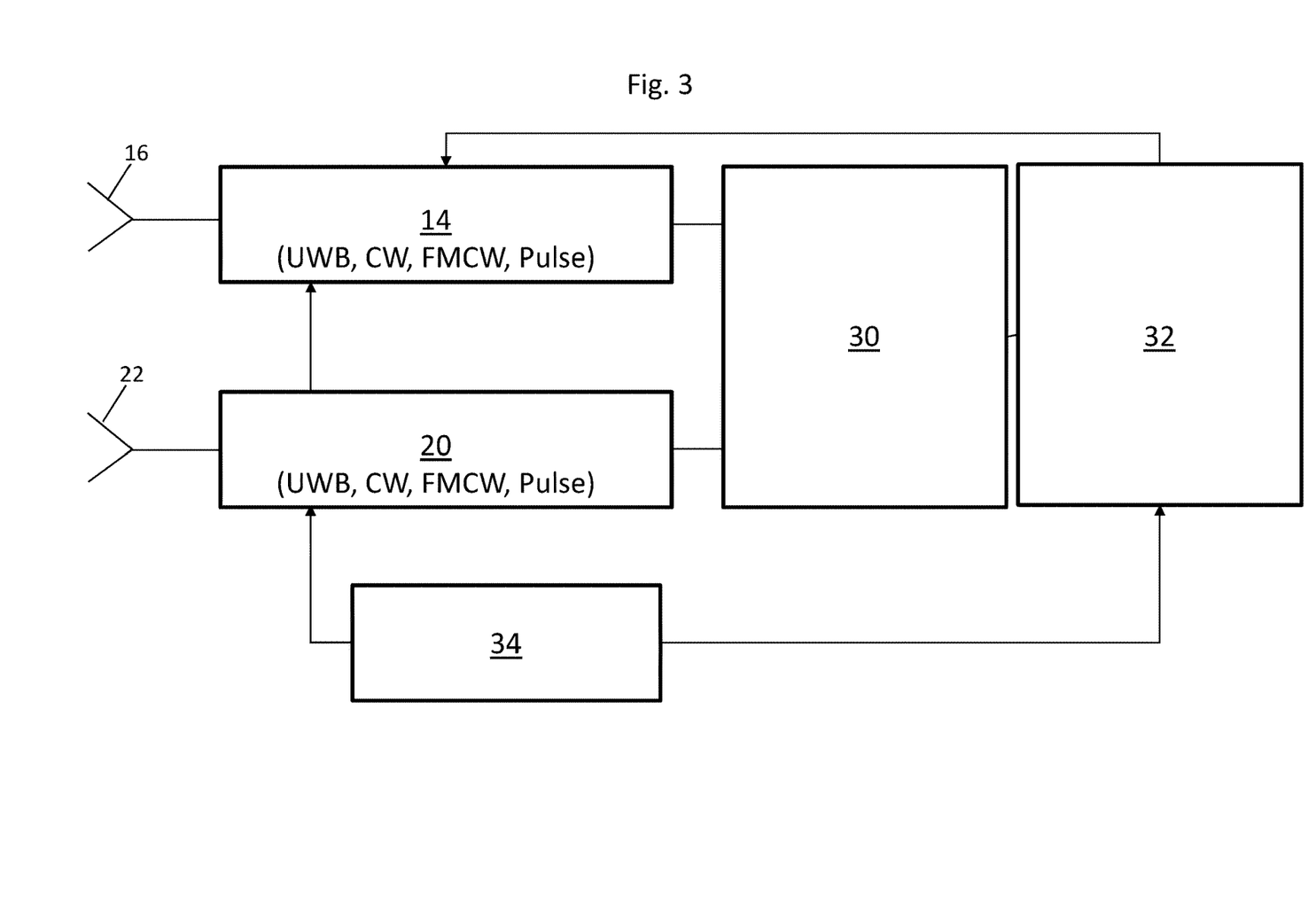
FIG. 3 illustrates an example arrangement where two radars are combined.
Figure 4:
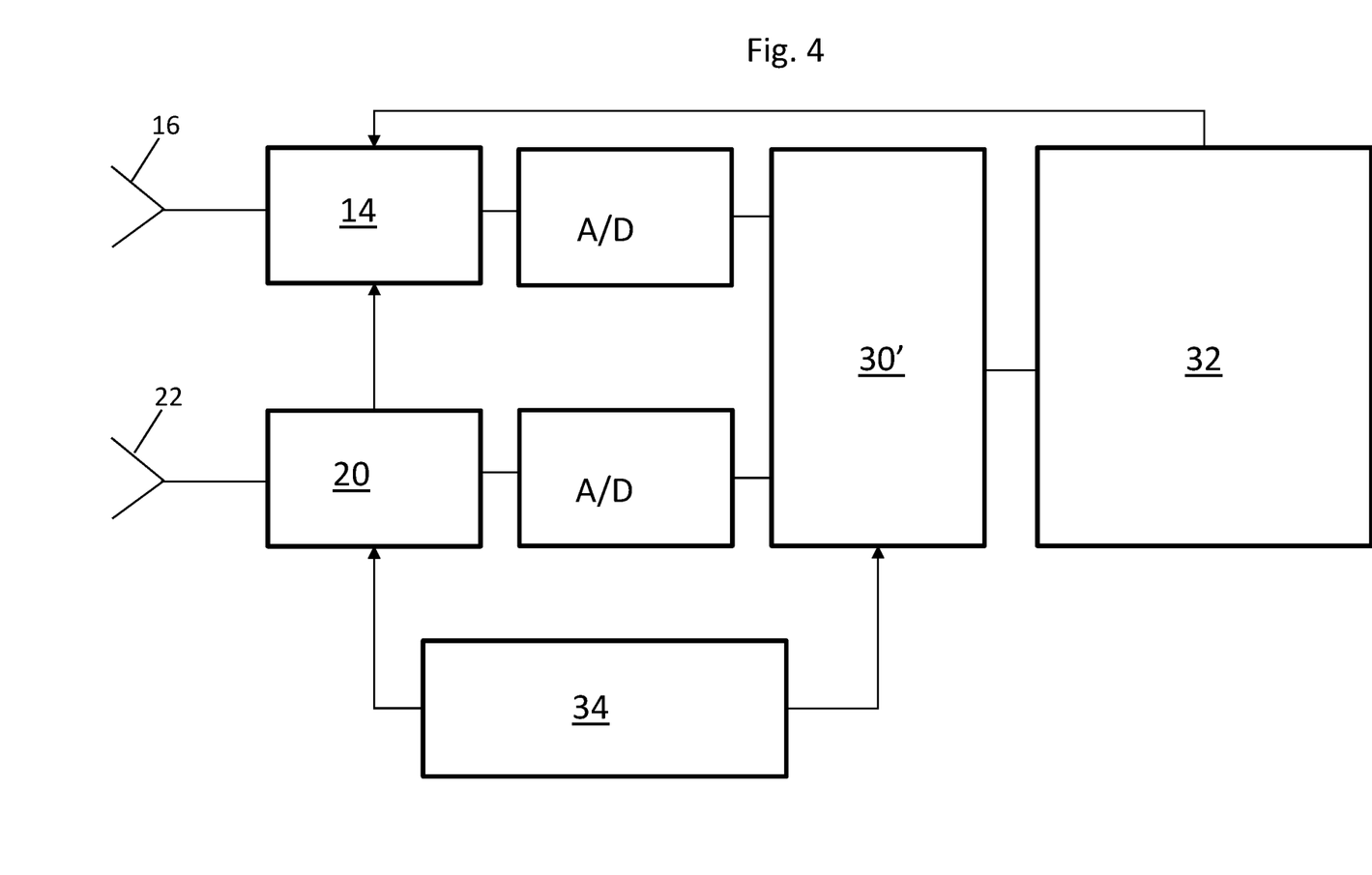
FIG. 4 shows an alternative arrangement to that of FIG. 3.

The presence sensor device 8 may include a signal processing and control arrangement as shown schematically in FIG. 3 or in FIG. 4. It is necessary to process the signals received from the antennas 18, 24 of the antenna systems 16, 22. The antennas 18, 24 can include separate transmitting and receiving antennas 18, 24, with at least one that can act as a transmitter and at least one that can act as a receiver. There may alternatively be one antenna for both transmitting and receiving, i.e. providing a combined transmitting and receiving capability. Transmitted radio signals from the transmitting antennas 18, 24 are reflected by objects such as presences requiring detection. The reflected signals are received by the receiving antennas 18, 24 in antenna systems 16, 22 and produce output signals that need processing in order to convert them into more usable information, such as processed radar signals with data indicating range and position (e.g. angular location) of the detected presence.

This processing can be done via a processor local to the radar sensor 14, 20, such as by using known radar sensors packaged together with signal processing devices in order to output radar data, i.e. distance and angle/position data for a sensed object. In this case the radar sensors 14, 20 may essentially be "off the shelf" sensors such as known sensor devices using one of Frequency Modulated Continuous Wave (FMCW) radar, Continuous Wave (CW) radar, pulse radar, or Ultra Wide-Band (UWB) radar. It will be seen that FIG. 3 shows a signal processing and control arrangement with sensors of this type. In that case the presence sensor device 8 includes a data integration module 30 for combining the data from the first radar sensor 14 and the second radar sensor 20 to thereby provide a combined output signal that may include contributions from both radar sensors 14, 20, such as in the case of a presence that is detected by both sensors. There is also a control module 32 for receiving the combined output signal, as well as for providing control functions. The control module 32 can be integrated with a processor that provides the data integration module 30, for example they may be different software modules operating on the same hardware. The control module 32 can have functions such as one or more of post-processing of the radar signals (the combined output signal); decision making (for example with reference to triggering an alert), visualisation and/or communication. In addition to the control module 32 there may be a synchronisation module 34 for synchronising the operation of the first and second radar sensors 14, 20, and once again this may be a software module operating on the same hardware as other modules, or it may be a separate element.

As an alternative to the arrangement of FIG. 3, the presence sensor device 8 may use a signal processing and control arrangement as shown schematically in FIG. 4, where the radar sensors 14, 20 do not include any integrated processor. Thus, in the case of FIG. 4, the receivers of both of the two radar sensors 14, 20 are arranged to send output signals via analogue to digital conversion to a processor of the presence sensor device 8, which receives and processes raw output signals from both of the radar sensors 14, 20. In FIG. 4 this processor is a combined signal processing and integration module 30', which performs the integration features provided by the integration module 30 of FIG. 3, as well as doing more basic signal processing of the radar signals. The two radar sensors can be integrated into a combined integrated circuit, e.g. sharing parts of a single chip, where a single dedicated processor is provided for both radar sensors 14, 20 via the processing and integration module 30'. As with the example of FIG. 3, there are also a control module 32 and synchronisation module 34, and these modules may also be integrated in one module.

What is claimed is:

1. A presence sensor device for a building, the presence sensor device being for detecting persons, wherein the presence sensor device comprises:
    a first radar sensor; and
    a second radar sensor;
    wherein the first radar sensor is arranged to operate with a first frequency band, a first power consumption, and a first range, with the second radar sensor being arranged to operate with a second frequency band, a second power consumption, and a second range;
    wherein the first frequency band is lower than the second frequency band, with the first range being longer than the second range;
    wherein the first radar sensor and second radar sensor comprise respective first and second antenna systems, with both antenna systems being part of a single device;
    wherein the first antenna system includes a first array of multiple antenna elements, and the second antenna system is in the form of a second array of multiple antenna elements wherein dimensions of the first array of multiple antenna elements is larger than dimensions of the second array of multiple antenna elements; and
    wherein the first antenna system includes an array of multiple antenna elements with the second antenna system being located between first and second antenna elements of the first antenna system and the second antenna system including a larger number of antenna elements than the number of elements in the first antenna system.

2. A presence sensor device as claimed in claim 1, wherein the second radar sensor is arranged to operate with a higher resolution than the first radar sensor such that the presence sensor device is capable of both long range sensing via the first radar sensor and short range sensing via the second radar sensor.

3. A presence sensor device as claimed in claim 1, wherein the presence sensor device is arranged to operate in a first mode where the first radar sensor is active and the second radar sensor is inactive and wherein in the first mode sensing of a presence by the first radar sensor triggers switching to a second mode, with activation of the second radar sensor, wherein in the second mode both of the first and second radar sensors are used.

4. A presence sensor device as claimed in claim 1, wherein the operating frequency band for the first radar sensor is a frequency that is in the range 800 MHz to 25 GHz, with the operating frequency band of the second radar sensor being higher than that of the first, and in the range 5-130 GHz.

5. A presence sensor device as claimed in claim 1, wherein the presence sensor device is for detecting presences such as people in a monitored zone and the monitored zone comprises: a long range detection zone where the first radar sensor with its longer range is used, and where presences may only need to be detected without the need for any additional detection information such as positioning; and a short range detection zone, covering a lesser area than the long range detection zone, where the second radar sensor is used in order to determine both distance and position when a presence is detected in the short range detection zone.

6. A presence sensor device as claimed in claim 5, wherein the first radar sensor and the second radar sensor are used together to sense presences in the short range detection zone.

7. A presence sensor device as claimed in claim 1, wherein each radar sensor comprises a processor for processing of the radar data to provide processed radar signals and the presence sensor device comprises a data integration module for combining the data from the first radar sensor and the second radar sensor to thereby provide a combined output signal.

8. A presence sensor device as claimed in claim 1, wherein the receivers of both of the two radar sensors are arranged to send output signals from the receivers to a processing and integration module of the presence sensor device, wherein the processing and integration module receives and processes raw output signals from both of the radar sensors as well as integrating the output from the two radar sensors to provide a combined output signal.

9. A presence sensor device as claimed in claim 1, comprising one or more further radar sensors with further differing capabilities.

10. A building control system comprising a presence sensor device as claimed in claim 1, wherein the building control system is arranged to use the presence sensor device for one or more of: detecting intruders, monitoring the location or movement of people during evacuations and/or identifying the presence of people in relation to control of HVAC systems.

11. A method comprising use of the presence sensor device of claim 1 for the detection of presences such as people.

12. A method as claimed in claim 11, comprising selectively operating the second, higher frequency, radar sensor in reaction to the output of the first, lower frequency, radar sensor, wherein in a first mode the first radar sensor is active and the second radar sensor is inactive and wherein sensing of a presence by the first radar sensor triggers a second mode, with activation of the second radar sensor, where in the second mode both of the first and second radar sensors are used.

* * * * *